3,226,362
POLYAMIDES FROM ALICYCLIC BISPHENYL-ENEOXYDICARBOXYLIC ACIDS

Winston J. Jackson, Jr., and John R. Caldwell, Kingsport, Tenn., assignors to Eastman Kodak Company, Rochester, N.Y., a corporation of New Jersey
No Drawing. Filed May 9, 1962, Ser. No. 193,593
9 Claims. (Cl. 260—47)

This invention relates to the preparation of a new class of alicyclic bridged ring bisphenyleneoxydicarboxylic acids and to the preparation of fiber- and film-forming linear polyamides and copolyamides from these acids.

It is known to produce dicarboxylic acids containing aromatic ether groups of the type represented by the following structural formula:

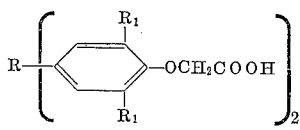

in which R is a straight chain or branched chain aliphatic group such as methylene and isopropylidene and $R_1$ can be alkyl or halogen. The preparation of such acids is described in J. Appl. Chem., 9, 594 (1959). It is also known from this disclosure and from U.S. Patents 2,158,064 and 2,191,556 that fiber-forming polyamides may be produced from such acids by reaction with suitable diamines. However, no high-melting polyamides referred to in these disclosures are readily soluble in low-boiling solvents and the only polyamides which are soluble in volatile solvents have such low melting points as to preclude or at least to limit their use in the preparation of films and textile fibers.

This invention has as one object to prepare a new class of acids which are identified as the alicyclic bridged ring bisphenyleneoxydicarboxylic acids.

Another object is to produce polyamides of the fiber- and film-forming variety from these acids which will have superior properties over related polymers of the prior art, particularly with respect to solubility in various solvents and with respect to melting point and hardness.

A further object is to provide a new class of high-melting fiber- and film-forming polyamides which are soluble in volatile, non-polar solvents such as methylene chloride and chloroform.

Other objects will appear hereinafter.

These objects are accomplished by the following invention, which is illustrated by several preferred embodiments set forth below.

Preparation of the new class of acids of our invention, which are identified as alicyclic bridged ring bisphenyleneoxydicarboxylic acids, may be carried out in accordance with the following equations.

(1)
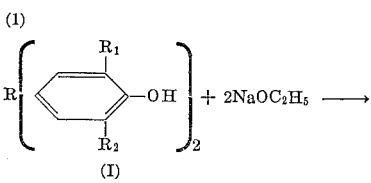

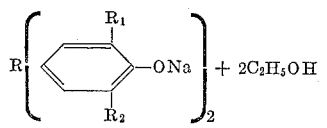

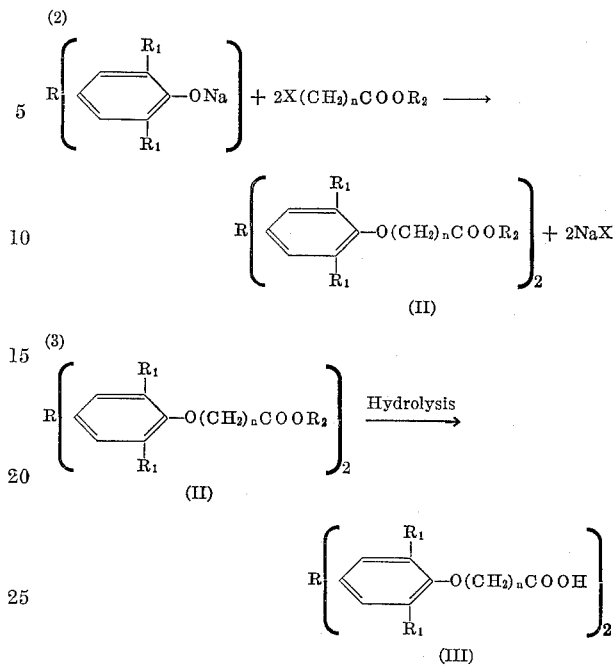

wherein R is a substituent selected from the group of bridged rings consisting of

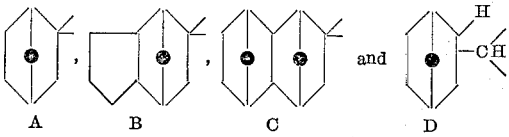

and wherein $R_1$ is a substituent selected from the group consisting of hydrogen, chlorine and straight and branched chain alkyl groups containing from 1 to 4 carbon atoms, $R_2$ is a substituent selected from the group consisting of hydrogen and alkyl groups containing from 1 to 10 carbon atoms, X is a substituent selected from the group consisting of chlorine and bromine and $n$ is 1 to 6.

The above bisphenols (I) and bisphenols containing other alicyclic bridged rings which may be used as the starting materials are described in the application of Caldwell and Jackson, entitled "Bisphenol Polyesters," Serial No. 137,980, filed September 14, 1961, which has been abandoned in favor of a continuation-in-part Serial No. 231,589, filed October 18, 1962. Other bisphenols of this class containing various substituents on the alicyclic bridged rings described in said application may also be used, such as 4,4'-(3-methyl-2-norcamphanylmethylene) diphenol, 4,4' - (tricyclo[2,2,1,0$^{2,6}$]heptan - 3 - ylidene)diphenol and 4,4'-(bicyclo[2,2,2]oct-2-ylidene)bis(2,6-dichlorophenol).

The preparation of aliphatic bisphenyleneoxydicarboxylic acids is described in J. Appl. Chem., 9, 594 (1959). A similar procedure may be used for preparing the alicyclic bisphenyleneoxydicarboxylic acids of this invention. A bisphenol of the structure indicated by (I) above is treated with sodium hydroxide or a sodium alkoxide in a solvent such as water, an alcohol, or dioxane. Suitable sodium alkoxides are sodium methoxide, sodium ethoxide, or sodium butoxide. The disodium salt thus obtained is then treated with an ω-chloro- or bromocarboxylic acid or ester. Purer products are usually obtained when the esters are used instead of their acids. When the product is a diester of the structure illustrated by (II) above, it is converted to the dicarboxylic acid of the structure indicated by (III) above by a conventional procedure such as acid hydrolysis, alkaline saponification, or ester interchange.

Ester interchange is a convenient and effective method for obtaining the dicarboxylic acid. This is accomplished by refluxing the crude diester (II) in formic or acetic acid in the presence of an acid catalyst such as sulfuric acid or toluenesulfonic acid. If the $R_2$ group of the ester is methyl or ethyl, the interchange reaction can be followed by distilling off the methyl or ethyl ester (formate or acetate) which is formed.

As indicated above, the acids thus produced are a new class of compounds which we have discovered to be of particular efficacy in the production of high-melting, fiber- and film-forming polyamides as will be more particularly set forth below. The distinguishing characteristic of these acids which gives them this particular usefulness is the presence therein of bridged alicyclic rings which, in the formation of the ultimate polymer, contributes a high melting point. Polymers produced from such acids are also characterized by solubility in various non-polar volatile solvents which makes possible the spinning of fibers from solution as well as the casting of films from solution.

The preferred method of preparing the polyamides of our invention is by reacting equimolar quantities of an alicyclic bridged ring bisphenyleneoxydicarboxylic acid represented by the general formula:

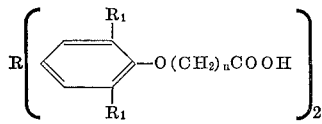

wherein R is a substituent selected from the group of bridged rings consisting of

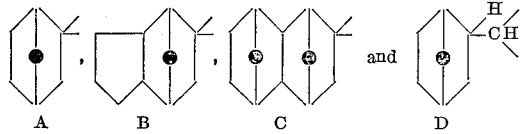

and wherein $R_1$ is a substituent selected from the group consisting of hydrogen, chlorine and straight and branched chain alkyl groups containing from 1 to 4 carbon atoms and $n$ is 1 to 6, with an organic diamine represented by the general formula:

$$NH_2—X—NH_2$$

wherein X is a substituent selected from the group consisting of divalent, straight chain and branched chain alkylene and ether alkylene groups of 2–20 carbon atoms (e.g. —$CH_2CH_2$—, —$(CH_2)_{10}$—, —$(CH_2)_3O(CH_2)_3$—, —$(CH_2)_3OCH_2CH_2O(CH_2)_3$—, etc. groups), a cycloalkylene group, selected from the group consisting of cyclohexylene and cyclohexylbismethylene groups (e.g.

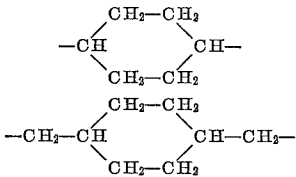

etc. groups), a substituent selected from the group consisting of phenylene, tolylene, xylylene, biphenylene and the group having the structure:

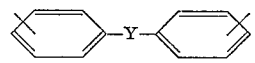

wherein Y is a substituent selected from the group consisting of phenyl, —$CH_2$—, —$CH_2CH_2$—,

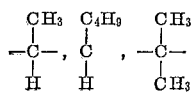

—$SO_2$—, —O—, and —$OCH_2CH_2O$—, at 200–300° C., until a resinous polyamide is formed.

Copolyamides may be prepared from a mixture of two or more of the diamines. Another copolyamide modification involves the use of 10–50 mole percent of a second dicarboxylic acid in place of part of the alicyclic bridged ring bisphenyleneoxydicarboxylic acid. Straight or branched chain aliphatic, alicyclic, or aromatic dicarboxylic acids represented by the general formula:

$$HOOC—Z—COOH$$

wherein Z represents a divalent alkylene group of 2–10 carbon atoms, a divalent cycloalkylene group, and a divalent phenylene group, are suitable modifiers.

The polyamides may be prepared by heating a salt containing equimolar amounts of a dicarboxylic acid and of the diamine in an inert solvent such as cresol or in an evacuated sealed tube at 200–300° C. It will of course be understood that the heating is carried out and so controlled as to produce a polymer of the fiber- and film-forming variety. Such a polymer will have an inherent viscosity of at least 0.4 and preferably 0.6 or higher. The inherent viscosity is defined as $$I.V. = \frac{\log_e Nr}{C}$$

in which $Nr$ is the viscosity of a dilute solution of the polymer in 60 parts by weight of phenol and 40 parts by weight of tetrachlorethane divided by the viscosity of the mixed solvent in the same units and at the same temperature, and C is the concentration in grams of polymer per 100 cc. of solution.

To obtain polymers of the desired viscosity it will usually be necessary to heat them to a temperature of 200–300° C. and to effect stirring under reduced pressure until the polymer attains the desired molecular weight. This is indicated by the viscosity of the melt. If the polymers melt above 220° C. it is advantageous to granulate them to a particle size which will pass a 20-mesh screen and heat in a vacuum or inert gas stream at a temperature somewhat below the melting point.

The polyamides also may be prepared by heating the diamine with an alkyl or aryl ester of the dicarboxylic acid at 200–300° C. in an inert atmosphere and then under reduced pressure. The polyamides also may be prepared by interfacial polycondensation by treating a mixture of the diamine with aqueous alkali and with the diacid chloride of the dicarboxylic acid in a water immiscible organic solvent such as chloroform, benzene, or xylene as described in J. Poly. Sc., 40, 329 (1959). Polyamides of aromatic diamines may be prepared by heating equimolar amounts of the diamine and the dicarboxylic acid at 200–300° C. in an inert atmosphere and then under reduced pressure.

Suitable diamines for carrying out the invention include ethylene diamine, 1,2-diaminopropane, 1,6-hexanediamine, 1,10-decanediamine, 3,3'-(ethylenedioxy)bispropylamine, 3,3'-(2,2-dimethyltrimethylenedioxy)bispropylamine, 1,3- and 1,4-cyclohexanediamine, 1,3- and 1,4-cyclohexanebis(methylamine), o, m, and p-phenylenediamine, 2,4- and 2,6-toluenediamine, 4,4'-diaminodiphenyl, m- and p-xylylene-α,α'-diamine, 3,3'- and 4,4'-methylenedianiline, 4,4'-dimethyl-3,3'-methylenedianiline, 4,4'-isopropylidenedianiline, 3,3'- and 4,4'-sulfonyldianiline, 4,4'-oxydianiline, 4,4'-ethylenedianiline, and the like.

Suitable dicarboxylic acids for replacing part of the alicyclic bisphenyleneoxydicarboxylic acid include dimethylmalonic acid, adipic acid, 3-methyladipic acid, sebacic acid, dodecanedioic acid, isophthalic acid, terephthalic acid, 1,4-cyclohexanedicarboxylic acid, 2,5-norbornanedicarboxylic acid, and the like.

The salts of any of the above diamines with any of the dicarboxylic acids of this invention can also be employed for making polyamides.

In the following examples we have set forth several of the preferred examples of our invention, but they are included merely for purposes of illustration and not as a limitation thereof.

*Example 1.—Preparation of [hexahydro-4,7-methanoindan-5-ylidenebis(p-phenyleneoxy)]diacetic acid*

The above acid is further identified by reference to the following formula:

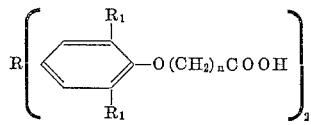

wherein R is the group:

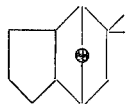

and wherein $R_1$ is hydrogen and $n$ is 1. To a solution of alcoholic sodium ethoxide prepared by dissolving 1.25 moles of sodium in 1 liter of anhydrous ethanol was added 0.50 mole of dry 4,4'-(hexahydro-4,7-methanoindan-5-ylidene)diphenol. After 1.5 moles of ethyl chloroacetate was added to this refluxing solution, the mixture was refluxed while stirring for 16 hours. It was then cooled and filtered from the sodium chloride. After removal of the ethanol, the crude ester was placed in a flask with an equal volume of formic acid and 0.4 ml. of concentrated sulfuric acid. This solution was refluxed, and ethyl formate was periodically removed from the top of a fractionating column attached to the flask. When no more distillate boiling at 55–60° C. was obtained and the temperature in the head remained at 100° C., the ester interchange reaction was completed. The product crystallized as the solution cooled. It was collected and washed with 50 percent acetic acid. It was then treated with decolorizing carbon and recrystallized from aqueous acetic acid. After the dicarboxylic acid was collected, washed, and dried, it melted at 214–217° C. Analysis of the product showed its composition as $C_{26}H_{28}O_6$, which is the correct empirical formula for this compound.

*Example 2.—Preparation of diamine salts of alicyclicbisphenyleneoxydicarboxylic acids*

Diamine salts were prepared by adding the alicyclic bisphenyleneoxydicarboxylic acid dissolved in ethanol to a slight excess of the diamine in ethanol. The salts precipitated immediately and were purified by recrystallizing from aqueous ethanol.

*Example 3*

A polyamide was prepared by heating 10 g. of the salt of [hexahydro-4,7-methanoindan-5-ylidenebis(p-phenyleneoxy)]diacetic acid (Example 1) and trans-1,4-cyclohexanebis(methylamine) while stirring in 10 ml. of cresol at 200° C. under nitrogen for 30 minutes. The mixture was then heated at 220° C. for 1 hour and 240° C. for 3 hours. The cresol was distilled off under reduced pressure, and stirring was continued at 250° C. for 3 hours under pressure of 0.5 mm. Fibers could be drawn from the viscous melt. The polymer had an inherent viscosity of 0.63 and a softening range of 215–226° C. High-tenacity fibers were wet-spun from methylene chloride into acetone.

*Example 4*

A polyamide was prepared by heating a salt of the acid of Example 1 and 1,6-hexanediamine in an evacuated, sealed tube at 250° C. for 1½ hrs. The tube was opened and the prepolymer product was then heated at 250° C. in a nitrogen atmosphere for 1 hr. and then at 250° C. under a vacuum of 0.5 mm. for 1 hr. Fibers of good physical properties could be drawn from the viscous melt. The polymer had an inherent viscosity of 0.82 and a softening range of 160–170° C.

*Example 5*

[2 - norcamphanylidenebis(2,6 - dichloro - p - phenyleneoxy)]diacetic acid (III), in which R=A, $R_1$=Cl, $n$=1, was prepared by the procedure of Example 1, using 4,4'-(2-norcamphanylidene)bis(2,6-dichlorophenol) as the diphenol. A polyamide was prepared from a salt of this acid and trans-1,4-cyclohexanebis(methylamine) according to the procedure of Example 3. Since the polymer became solid when the cresol was removed under reduced pressure at 250° C., it was granulated to pass a 20-mesh screen and then heated at 250° C. under a vacuum of 0.1 mm. for 2 hrs. The polymer had an inherent viscosity of 1.14 and a softening range of 260–275° C., and fibers of good physical properties could be drawn from the viscous melt or dry-spun from chloroform solution.

*Example 6*

[Decahydro - 1,4,5,8 - dimethanonaph-2-ylidenebis(p-phenyleneoxy)]dihexanoic acid (III, R=C, $R_1$=H, $n$=5) was prepared by the procedure of Example 1, using ethyl 6 - bromohexanoate and 4,4'-(decahydro-1,4,5,8-dimethanonaph-2-ylidene)diphenol as the diphenol. A polyamide was prepared from the salt of this acid and 1,4-cyclohexanediamine according to the method of Example 4. The polymer had an inherent viscosity of 0.59 and a softening range of 230–245° C. and could be employed to produce fibers of good physical properties as in Example 5.

*Example 7*

[2 - norcamphanylmethylenebis(p - phenyleneoxy)]diacetic acid (III, R=D, $R_1$=H, $n$=1) was prepared by the procedure of Example 1, using 4,4'-(2-norcamphanylmethylene)diphenol as the diphenol. A polyamide was prepared from the salt of this acid and p-xylylene-$\alpha,\alpha'$-diamine according to the procedure of Example 3. The polymer had an inherent viscosity of 0.66 and a softening range of 210–230° C. Fibers and cast and molded products could be produced from the polymer.

*Example 8*

Equivalent amounts of [hexahydro-4,7-methanoindan-5-ylidenebis(p-phenyleneoxy)]diacetic acid (Example 1) and 4,4'-methylenedianiline were heated in a nitrogen atmosphere at 200° C. for 1 hr. and then at 250° for 1 hr. The polymer was granulated to pass a 20-mesh screen and heated at 270° C. under a vacuum of 0.1 mm. for 2 hr. The polymer had an inherent viscosity of 0.61 and a softening range of 275–285° C. Fibers and other products could be produced from the polymer.

*Example 9*

A polyamide was prepared from the diacid chloride of the acid used in Example 5 and 2,4-toluenediamine by conventional interfacial polymerization techniques [J. Poly. Sc. 40, 330 (1959)]. The polymer had an inherent viscosity of 0.84 and a softening range of 140–150° C. Fibers and films of good quality could be produced from the polymer.

*Example 10*

Equimolar amounts of [2-norcamphanylmethylenebis-(p-phenyleneoxy)]diacetic acid (Example 7) and m-phenylenediamine were heated with 0.1 percent by weight (based on the total mixture) of litharge for 1.5 hr. at 200° C. The temperature was then increased to 280° C. for 1 hr. Finally, the polymerization was completed by heating the mixture for 1 hr. at 280° C. under a pressure of 0.1 mm. The polymer had an inherent viscosity of 0.56 and a softening range of 250–260° C.

*Example 11*

The procedure of Example 10 was used in preparing a polyamide from the dicarboxylic acid of Example 1 and 4,4'-dimethyl-3,3'-methylenedianiline. The polymer had an inherent viscosity of 0.61 and a softening range of 200–215° C.

*Example 12*

A copolyamide was prepared from 1,4′-cyclohexanebis-(methylamine) salts of adipic acid (25 mole percent) and the dicarboxylic acid of Example 6 (75 mole percent). The procedure of Example 3 was used. The polymer had an inherent viscosity of 0.82 and a softening range of 190–210° C. It had improved flow characteristics on molding.

*Example 13*

A copolyamide was prepared from the dicarboxylic acid of Example 1, 75 mole percent of 4,4′-diaminodiphenyl, and 25 mole percent of 3,3′-(2,2-dimethyltrimethylene-dioxy)bispropylamine by the procedure of Example 10. The polymer had an inherent viscosity of 0.60 and a softening range of 220–230° C. Fibers and cast or molded products can be produced from the polymer.

By following the procedures of the above examples other polyamides and copolyamides may be prepared from the alicyclic bridged ring bisphenyleneoxydicarboxylic acids in the invention and any of the mentioned diamines and other dicarboxylic acids that are suitable for replacing part of the alicyclic bridge ring bisphenyleneoxydicarboxylic acids. The products have generally similar properties as those of the examples. Even though the polymers are high-melting, they are soluble in volatile, non-polar solvents such as methylene chloride and chloroform or mixtures of these solvents with alcohols, which solutions can be wet-spun or dry-spun into strong fibers or coated into clear, flexible sheets and films. The latter products are useful among other things as photographic film supports or as a subbing base when attached to other films for photographic applications. Since the polyamides of this invention are hard materials, they are valuable as protective coatings on shaped objects or metal, glass, wood, and other materials. The polymers of this invention are thermoplastic and shaped objects can be obtained by injection-molding, fibers can be obtained by melt-spinning, and films and sheets by extrusion. If desired, various fillers, pigments, dyes, lubricants, plasticizers, etc., can be incorporated into the polyamide products of the invention.

Although the invention has been described in considerable detail with particular reference to certain preferred embodiments thereof, variations and modifications can be effected within the spirit and scope of the invention as described hereinabove and as defined in the appended claims.

We claim:

1. A resinous polycarbonamide of equimolar proportions of (A) a dicarboxylic acid having at least 4 carbon atoms, of which from 50 to 100 mole percent is a bisphenyleneoxydicarboxylic acid having the structural formula:

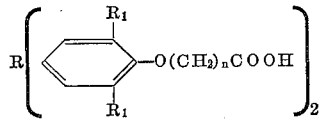

wherein R is a substituent selected from the group of bridged rings consisting of

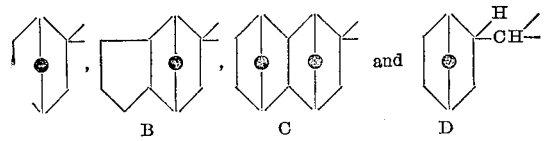

and wherein $R_1$ is as substituent selected from the group consisting of hydrogen, chlorine, and straight and branched chain alkyl groups containing from 1 to 4 carbon atoms and $n$ is 1 to 6, and (B) an organic diamine represented by the general formula:

$$NH_2—X—NH_2$$

wherein X is a substituent selected from the group consisting of divalent, straight chain and branched chain alkylene and ether alkylene groups of 2–20 carbon atoms, a cycloalkylene group selected from the group consisting of cyclohexylene and cyclohexylbismethylene groups, a substituent selected from the group consisting of phenylene, tolylene, xylylene, biphenylene and the group having the structure:

wherein Y is a substituent selected from the group consisting of phenyl, $—CH_2—$, $—CH_2CH_2—$,

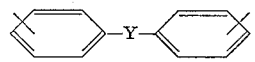

$—SO_2—$, $—O—$, and $—OCH_2CH_2O—$.

2. A resinous polycarbonamide of equimolar proportions of [hexahydro-4,7-methanoindan-5-ylidenebis(p-phenyleneoxy)]diacetic acid and trans-1,4-cyclohexanebis(methylamine).

3. A resinous polycarbonamide of equimolar proportions of [hexahydro-4,7-methanoindan-5-ylidenebis(p-phenyleneoxy)]diacetic acid and 1,6-hexanediamine.

4. A resinous polycarbonamide of equimolar proportions of [2-norcamphanylidenebis(2,6-dichloro-p-phenyleneoxy)]diacetic acid and trans-1,4-cyclohexanebis(methylamine).

5. A resinous polycarbonamide of equimolar proportions of [hexahydro-4,7-methanoindan-5-ylidene-bis(p-phenyleneoxy)]diacetic acid and 4,4′-methylenedianiline.

6. A resinous polycarbonamide of equimolar proportions of [2-norcamphanylmethylenebis(p-phenyleneoxy)]diacetic acid and p-xylylene-α,α′-diamine.

7. A resinous polycarbonamide of equimolar proportions of [2-norcamphanylidenebis(2,6-dichloro-p-phenyleneoxy)]diacetic acid and 2,4-toluenediamine.

8. A polycarbonamide as defined by claim 1 of (A) adipic acid and [decahydro-1,4,5,8-dimethanonapth-2-ylidenebis(p-phenyleneoxy)]dihexanoic acid, and (B) 1,4-cyclohexanediamine.

9. A polycarbonamide as defined by claim 1 of (A) [hexahydro-4,7-methanoindan-5-ylidenebis(p-phenyleneoxy)]diacetic acid, and (B) 4,4′-diaminodiphenyl and 3,3′-(2,2-dimethyltrimethylenedioxy)bis(propylamine).

References Cited by the Examiner

UNITED STATES PATENTS

| | | | |
|---|---|---|---|
| 2,158,064 | 5/1939 | Carothers | 260—78 |
| 2,191,556 | 2/1940 | Carothers | 260—78 |
| 2,854,479 | 9/1958 | Britton et al. | 260—520 |
| 2,937,162 | 5/1960 | Martin et al. | 260—78 |
| 2,954,400 | 9/1960 | Shapiro et al. | 260—520 |
| 2,972,602 | 2/1961 | Caldwell et al. | 260—78 |

WILLIAM H. SHORT, *Primary Examiner.*

J. R. LIBERMAN, *Examiner.*

UNITED STATES PATENT OFFICE
CERTIFICATE OF CORRECTION

Patent No. 3,226,362            December 28, 1965

Winston J. Jackson, Jr., et al.

It is hereby certified that error appears in the above numbered patent requiring correction and that the said Letters Patent should read as corrected below.

Column 7, lines 64 to 69, the extreme left-hand formula should appear as shown below instead of as in the patent:

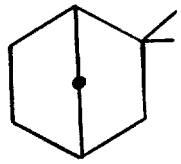

A

Signed and sealed this 10th day of January 1967.

(SEAL)
Attest:

ERNEST W. SWIDER
Attesting Officer

EDWARD J. BRENNER
Commissioner of Patents